United States Patent
Cantin et al.

(10) Patent No.: US 7,855,376 B2
(45) Date of Patent: *Dec. 21, 2010

(54) LIGHTING SYSTEM AND METHOD FOR ILLUMINATING AND DETECTING OBJECT

(75) Inventors: Daniel Cantin, Sainte-Foy (CA); Yvan Mimeault, Québec (CA); Pascal Gallant, Québec (CA)

(73) Assignee: Institut National D'Optique, Sainte-Foy, QC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/612,678

(22) Filed: Dec. 19, 2006

(65) Prior Publication Data

US 2007/0228262 A1    Oct. 4, 2007

Related U.S. Application Data

(60) Provisional application No. 60/751,284, filed on Dec. 19, 2005.

(51) Int. Cl.
   *G01N 21/86*   (2006.01)
   *G06M 7/00*    (2006.01)
(52) U.S. Cl. .................. 250/559.29; 250/221
(58) Field of Classification Search ........... 250/206.1, 250/206.2, 221, 559.29–559.31, 559.38; 356/3–22; 362/459, 460, 464, 466
   See application file for complete search history.

(56) References Cited

U.S. PATENT DOCUMENTS

| | | | | |
|---|---|---|---|---|
| 3,967,111 A | * | 6/1976 | Brown | ........................ 250/206 |
| 4,733,961 A | * | 3/1988 | Mooney | ..................... 356/5.08 |
| 5,629,704 A | | 5/1997 | Throngnumachai et al. | |
| 5,836,583 A | | 11/1998 | Towers | |
| 6,281,632 B1 | * | 8/2001 | Stam et al. | ..................... 315/82 |
| 6,821,003 B2 | | 11/2004 | Baker et al. | |
| 7,221,271 B2 | * | 5/2007 | Reime | ........................ 340/541 |
| 2005/0117364 A1 | * | 6/2005 | Rennick et al. | ............. 362/540 |
| 2007/0091294 A1 | * | 4/2007 | Hipp | ......................... 356/4.01 |

FOREIGN PATENT DOCUMENTS

| | | |
|---|---|---|
| EP | 1334869 | 8/2003 |
| WO | WO 2004039631 A1 * | 5/2004 |
| WO | WO2005072358 | 8/2005 |

OTHER PUBLICATIONS

Supplementary European Search Report, EP06840494.6, Aug. 2, 2010.

* cited by examiner

*Primary Examiner*—Que T Le
*Assistant Examiner*—Pascal M Bui-Pho
(74) *Attorney, Agent, or Firm*—Ogilvy Renault LLP

(57) ABSTRACT

An object-detecting lighting system comprises a light source emitting visible light. A source controller is connected to the light source to drive the light source into emitting the visible light in a predetermined mode. An optical detector is positioned with respect to the light source and is adapted to detect the visible light as reflected/backscattered by an object. A data/signal processor is connected to the source controller and the optical detector to receive detection data from the optical detector. The data/signal processor produces a data output associated to the object as a function of the predetermined mode and the detection data.

15 Claims, 8 Drawing Sheets

LIGHTING SYSTEM AND METHOD FOR ILLUMINATING AND DETECTING OBJECT

CROSS-REFERENCE TO RELATED APPLICATION

This patent application claims priority on U.S. Provisional Patent Application No. 60/751,284, filed on Dec. 19, 2005.

FIELD OF THE INVENTION

The present invention generally relates to lighting systems and more particularly to object-detection using visible light emitted by a lighting system.

BACKGROUND OF THE INVENTION

It has been known since the 1990's that white light-emitting diodes (hereinafter "LEDs") can provide light that in some ways reproduces incandescent or fluorescent lighting systems with higher efficiency. These LEDs also emit light almost instantaneously (very fast turn on) and also stop emitting light almost instantaneously as well (very fast shut down response). However, until recently these LEDs were not showing sufficient power output in a single unit to provide ambient lighting or to be part of lamps and luminaires. For a few years, LEDs have been a part of flashlights or small lighting devices that can be used for leisure or as security lighting requiring small electrical power consumption. LEDs have been used for decades as light sources in remote controls and sensors in different types of appliances, industrial applications, and home utilities.

Nowadays, LEDs are developed by many manufacturers in order to make them a part of applications requiring powerful lighting such as headlamps in the automotive industry, lamps in household or industrial applications, and streetlights or luminaires. Advantages associated with LEDs include lower power consumption through an increased electrical to visible light conversion efficiency, longer lifetime, faster switching time, relative directivity of light coming out from them, and compactness allowing special designs to be developed. It is a question of a few years before LEDs will be part of powerful lighting systems replacing currently used incandescent and fluorescent lighting systems.

SUMMARY OF INVENTION

It is an object of the present invention to provide a novel object-detecting lighting system.

It is a further object of the present invention to provide a novel method for detecting objects using visible light.

Therefore, in accordance with the present invention, there is provided a method for detecting an object using visible light, comprising the steps of: providing a visible-light source emitting visible light having a first function of being visible to a person; connecting a source controller to the visible-light source; driving the visible-light source into emitting visible light in a predetermined mode; receiving a reflection/backscatter of the emitted visible light on an object; and identifying a position of the object as a function of the reflection/backscatter received and of the predetermined mode.

Further in accordance with the present invention, there is provided an object-detecting lighting system comprising: a light source emitting visible light and having a first function of emitting visible light for at least one of illuminating an environment and emitting a signal to a person in the environment; a source controller connected to the light source to drive the light source into emitting the visible light in a predetermined mode; an optical detector positioned with respect to the light source and adapted to detect the visible light as reflected/backscattered by an object; and a data/signal processor connected to the source controller and the optical detector to receive detection data from the optical detector, the data/signal processor producing a data output associated to the object as a function of the predetermined mode and the detection data.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
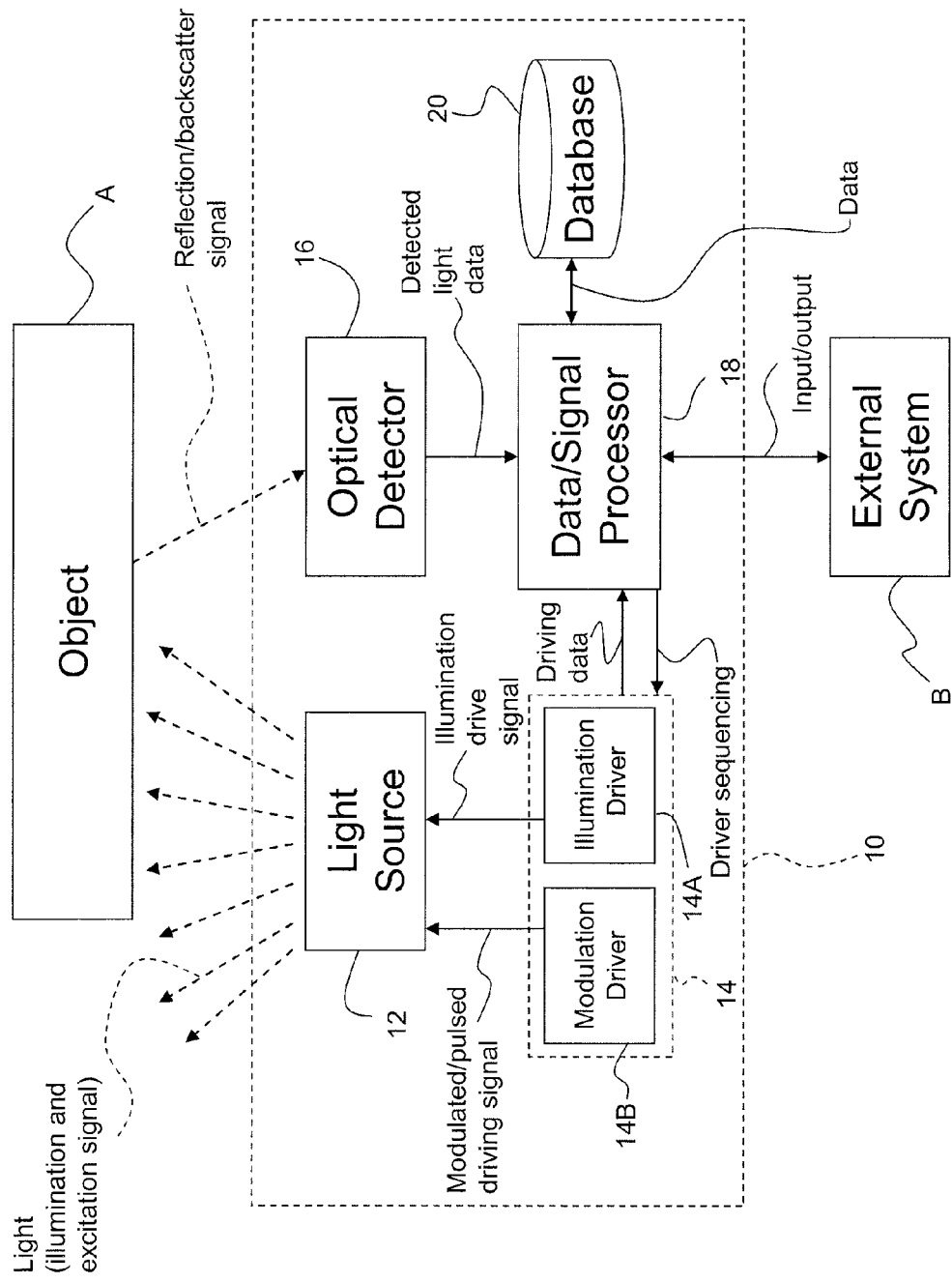
FIG. 1 is a block diagram illustrating an object-detecting lighting system of the present invention.

Referring to FIG. 1, an object-detecting lighting system in accordance with a preferred embodiment of the present invention is generally shown at 10.

The system 10 has a visible-light source 12. The visible-light source 12 has a first function the emission of visible light with enough intensity such that a user can collect information from its environment in a direct way (by seeing the light source 12) or indirect way (from scene illumination) through human vision, whether it be by illumination of the environment or emission of a signal. Examples of such lighting systems include lamps, illuminators, signs and displays, status indicators, amongst others. In a preferred embodiment, the visible-light source 12 has one or more LEDs, in accordance with the selected application of the system 10, a few of which are described hereinafter. As examples, the visible-light source 12 may be in the form of a home lighting fixture (e.g., lamp, illuminators), a traffic light, a street light system, a car headlight, taillight and/or brakelight, to only name a few applications.

The visible-light source 12 is connected to a source controller 14, so as to be driven into producing light. In addition to emitting light, the system 10 performs detection of objects A (objects can include solids, airborne particles, gases and liquids, as long as the object provides enough reflected light to be detected) when these objects are part of the environment/scene illuminated by the light source 12. Accordingly, the source controller 14 drives the visible-light source 12 in a predetermined mode, such that the emitted light takes the form of a light signal, for instance by way of amplitude-modulated or pulsed light emission.

These light signals are such that they can be used to provide the lighting illumination level required by the application, through data/signal processor 18 and source controller 14, while providing the required lighting. This means a detectable signal is present. Accordingly, it is possible to obtain a light level equivalent to a continuous light source by modulating the light signal fast enough (e.g., more than 100 Hz frequency) to be imperceptible to the eye and having an average light power equivalent to a continuous light source.

In an embodiment, the source controller 14 is designed to provide an illumination drive signal, such as a constant DC signal or a pulse-width modulated (PWM) signal, that is normally used in lighting systems to produce the required illumination and control its intensity. The illumination drive signal is produced by the illumination driver sub-module 14A of the controller 14. A modulated/pulsed driving signal supplies the fast modulation/pulse sequence required for remote object detection. This modulated/pulsed drive signal is produced by a modulation driver sub-module 14B of the controller 14. Both driving signals can be produced independently or in combination. Sequencing of the drive signal is controlled by the data/signal processor 18.

Figure 2:
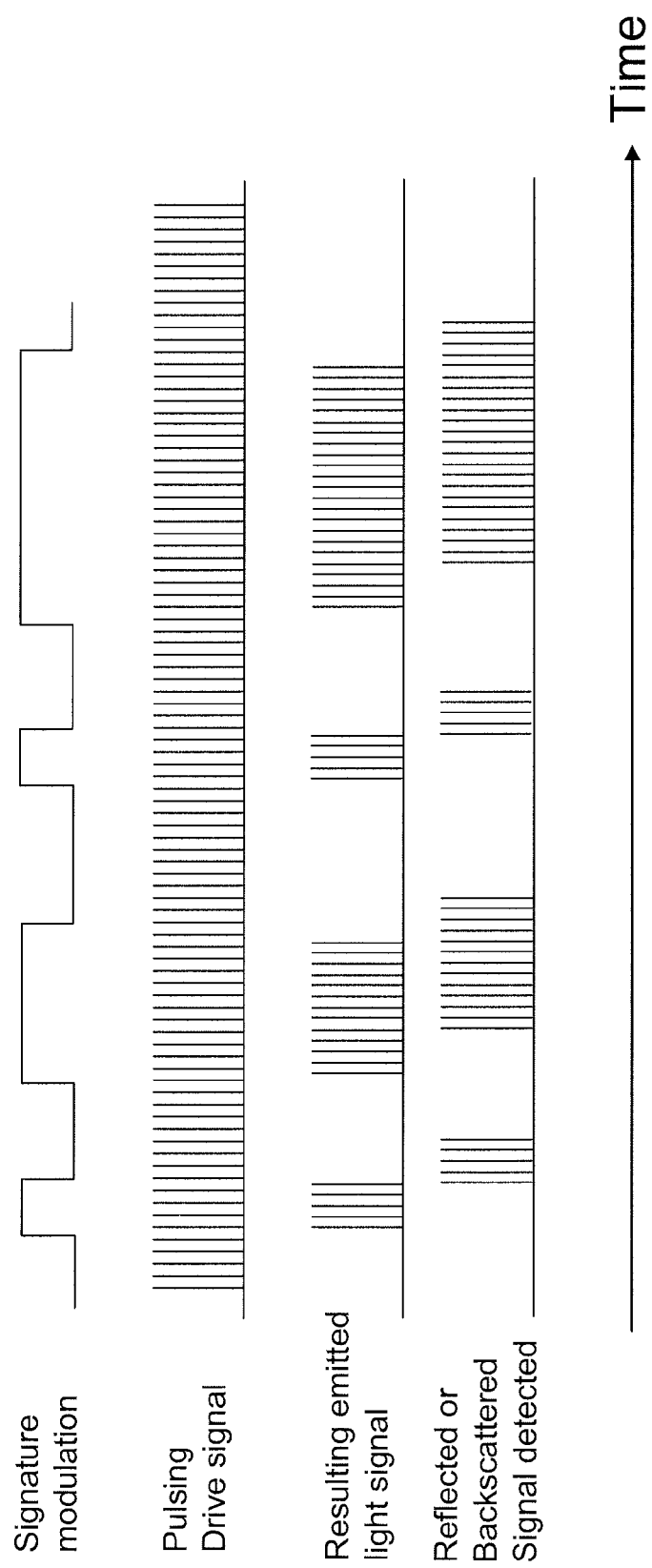
FIG. 2 is a schematic view illustrating a light signal of the object-detecting lighting system of FIG. 1, resulting from a combination of a pulsing drive signal with signature modulation.

Referring to FIG. 2, it is considered to combine both modulation and pulsing to provide a signature to the emitted light. More specifically, there is illustrated in FIG. 2 a signature modulation that is combined to a pulsing drive signal, so as to produce a light signal combining both modulation and pulsing. This combination of pulsing and modulation is suitably used when a plurality of items are using the lighting system 10, so as to avoid interference between signals. For instance, if most cars are equipped with the object-detecting lighting system 10, the combination of modulation and pulsing is advantageously used.

The visible-light source 12 has in a preferred embodiment LEDs. More specifically, LEDs are well suited to be used in the lighting system 10 has LED intensity can be efficiently modulated/pulsed at high speed. Using this possibility, current lighting systems already installed for standard lighting applications can be used as the light source 12 for sensing applications.

These applications range from presence detection for home lighting controls, to distance measurements between cars for adaptive cruise control, passing through fog or smoke detection, and going through spectroscopic measurements for gas emission or smog detection.

A detector 16 is associated with the visible-light source 12. The detector 16 is an optical detector (or detectors) provided so as to collect the light signal for instance reflected or diffused (i.e., backscattered) by the object A. The light signal can also come from an object A being the direct source of this light (such as a remote control) in order to send information to the data/signal processor through the optical detector 16. The optical detector 16 is as an example any of photodiodes, avalanche photodiodes (APD) or photomultipliers (PMT).

Figure 3:
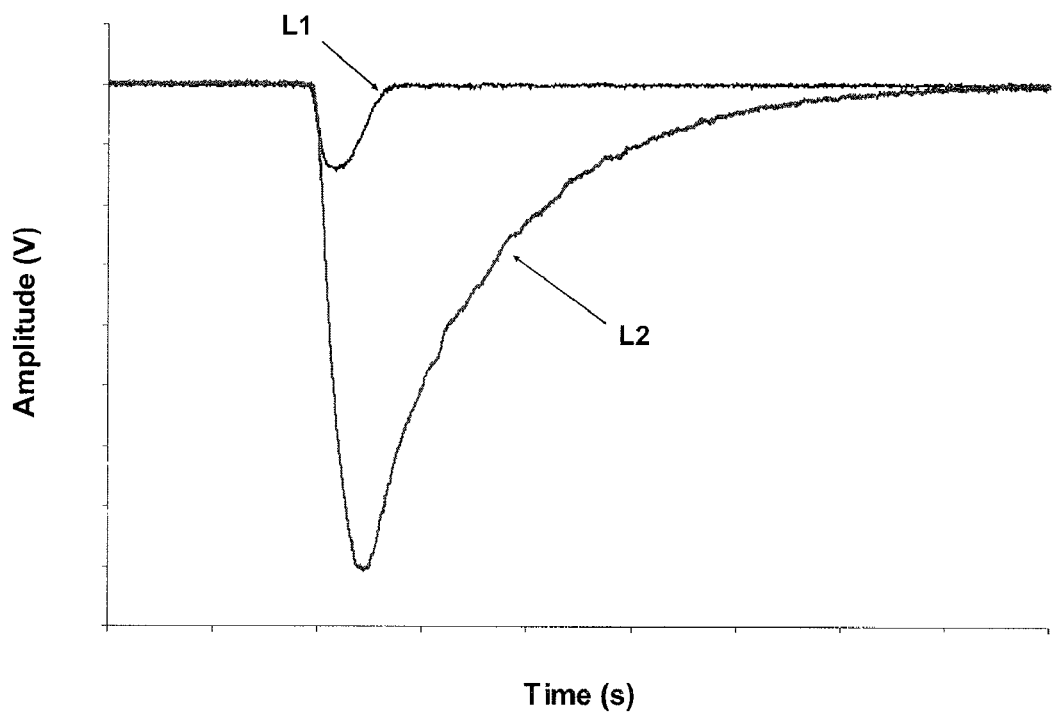
FIG. 3 is a graph illustrating an amplitude of blue light over time as compared with unfiltered light from a high-brightness white LED.

Filters are typically provided with the detector 16 to control ambient light background emitted from sources other than the lighting system 10. Filters can also be used for spectroscopic measurements and to enhance performance of the light source 12. For instance, there is illustrated in FIG. 3 a pulsed visible-light signal from a white LED filtered to blue as shown at L1 as compared with an unfiltered light signal shown at L2. In the case of white LEDs, the phosphor used converts the blue light of the LED junction into visible light with a certain time delay because of the phosphorescence emission lifetime.

Figure 4:
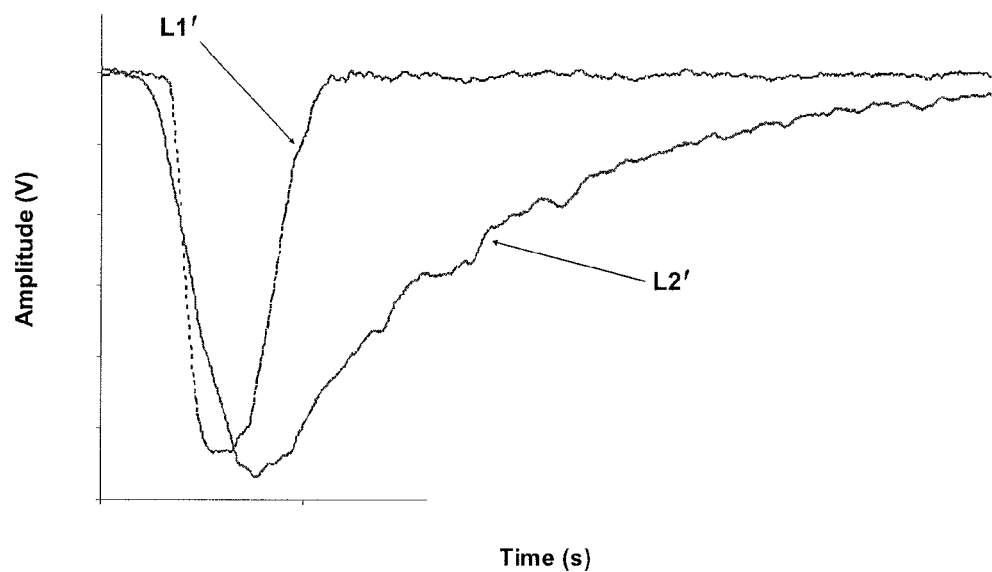
FIG. 4 is a graph illustrating an amplitude of blue light over time emitted by a high-brightness white LED as compared to light from a phosphor light emission isolated with another filter.

In some applications, the blue part L1' of the emission spectrum of white phosphorescent LEDs is preferably used, with proper wavelength filtering at detection, to allow faster light modulation, since the blue part L1' will not suffer the phosphorescent material usual modulation speed reduction, as is illustrated in FIG. 4 by L2'. This would allow either faster modulation speed or light pulses while keeping the broadband illumination of the white LED for the scene illumination.

A data/signal processor 18 is connected to the detector 16, and receives detected light data therefrom. The data/signal processor 18 is also connected to the source controller 14, so as to receive driving data therefrom. The data/signal processor 18 has a processing unit (e.g., CPU) so as to interpret the detected light data from the detector 16, in comparison with the driving data of the source controller 14, which provides information about the predetermined mode of emission of the light signals emitted by the visible-light source 12.

Accordingly, information about the object (e.g., presence, distance, speed of displacement, composition, dimension) is calculable by the data/signal processor 18 as a function of the relation (e.g., phase difference, relative intensity, spectral content, time of flight, etc.) between the driving data and the detected light data. A database 20 may be provided in association with the data/signal processor 18 so as to provide historical data, or tabulated data to accelerate the calculation of the object parameters.

In view of the calculation it performs, the data/signal processor 18 controls the source controller 14 and thus the light output of the visible-light source 12. For instance, the visible-light source 12 may be required to increase or reduce its intensity, or change the parameters of its output.

Additionally, the data/signal processor 18 may send the calculation output to an external system B in such a way that the external system B acts upon the information provided by the data/signal processor 18. For instance, the external system B may be the processing unit of a cruise-control system of a vehicle. As another non-exclusive example, the external system B may be a traffic-light central controlling unit. The external system B can also give input parameters to be used to the data/signal processor 18. These parameters can be adjustments to be performed to current calibration, new programs to be implemented for the current application, or data to be added to the database 20.

The configuration of the detector 16 and of the data/signal processor 18 is dependent on the application's requirements. One difficulty in many applications is to obtain an appropriate distance measurement when multiple objects are located at different positions within the fields of view of both the light source 12 and the optical detector 16. In such a case, each object in the field of view will contribute to the final distance value, weighed according to its real distance and reflectivity. One of the ways to get around this issue is to restrict the field of view of the detector(s), which limits the volume of space being probed. Sensor configurations are arranged according to the specifications required from the application.

Figure 5:
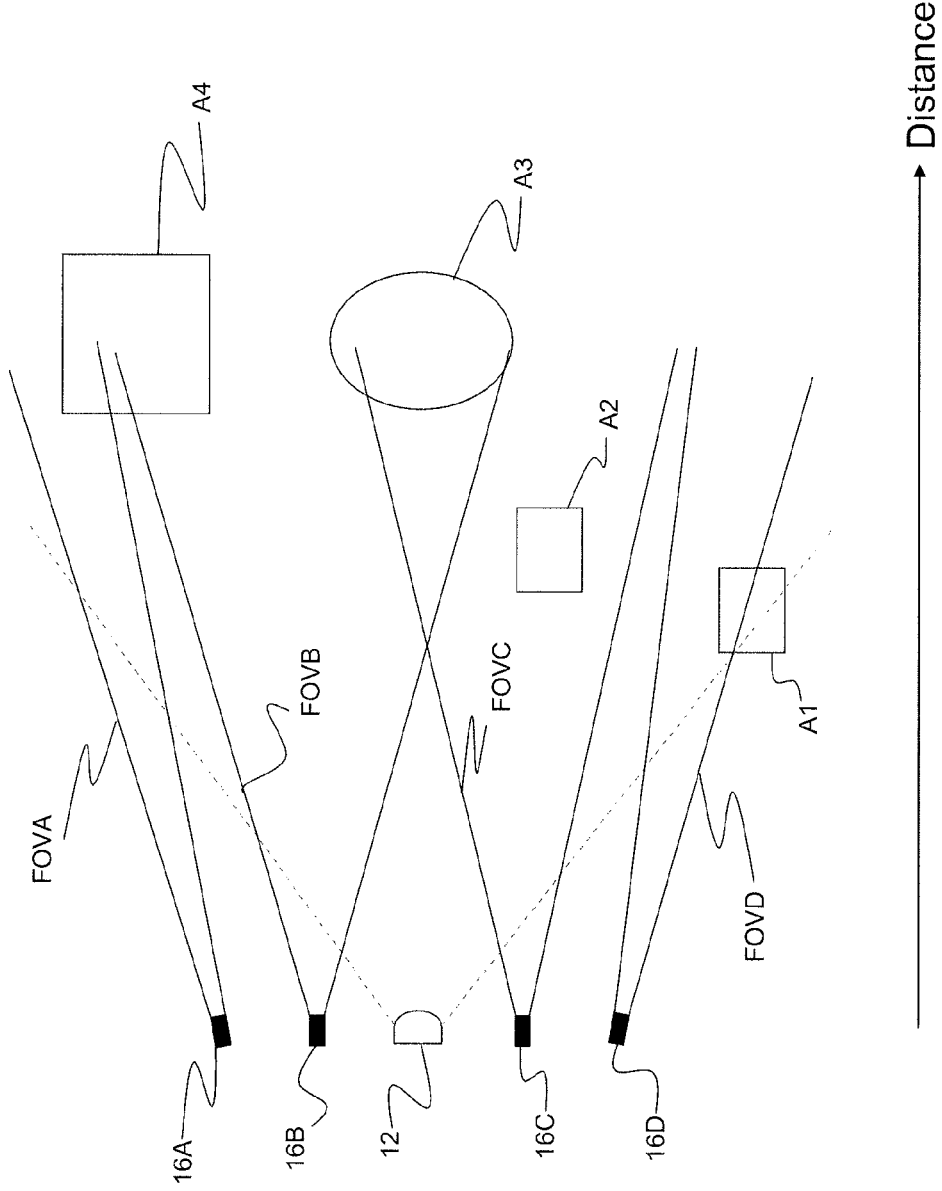
FIG. 5 is a schematic view of an alternative sensor configuration for the object-detecting lighting system of FIG. 1, with multiple detectors.

Referring to FIG. 5, an alternative embodiment of the sensor configuration involves a plurality of discrete detectors 16A to 16D, each observing a respective fixed field of view FOVA through FOVD within a volume of space illuminated by the light source 12 and comprising objects A1 through A4. Fields of view of the detectors 16A to 16D are narrow or might be a combination of narrow and wide field of views as a trade-off between distance accuracy and number of detectors necessary. The optical detector 16 is as an example any of photodiodes, APD or PMT. Such a configuration provides simplicity of design at the price of increased number of components and less intuitive integration.

Figure 6:
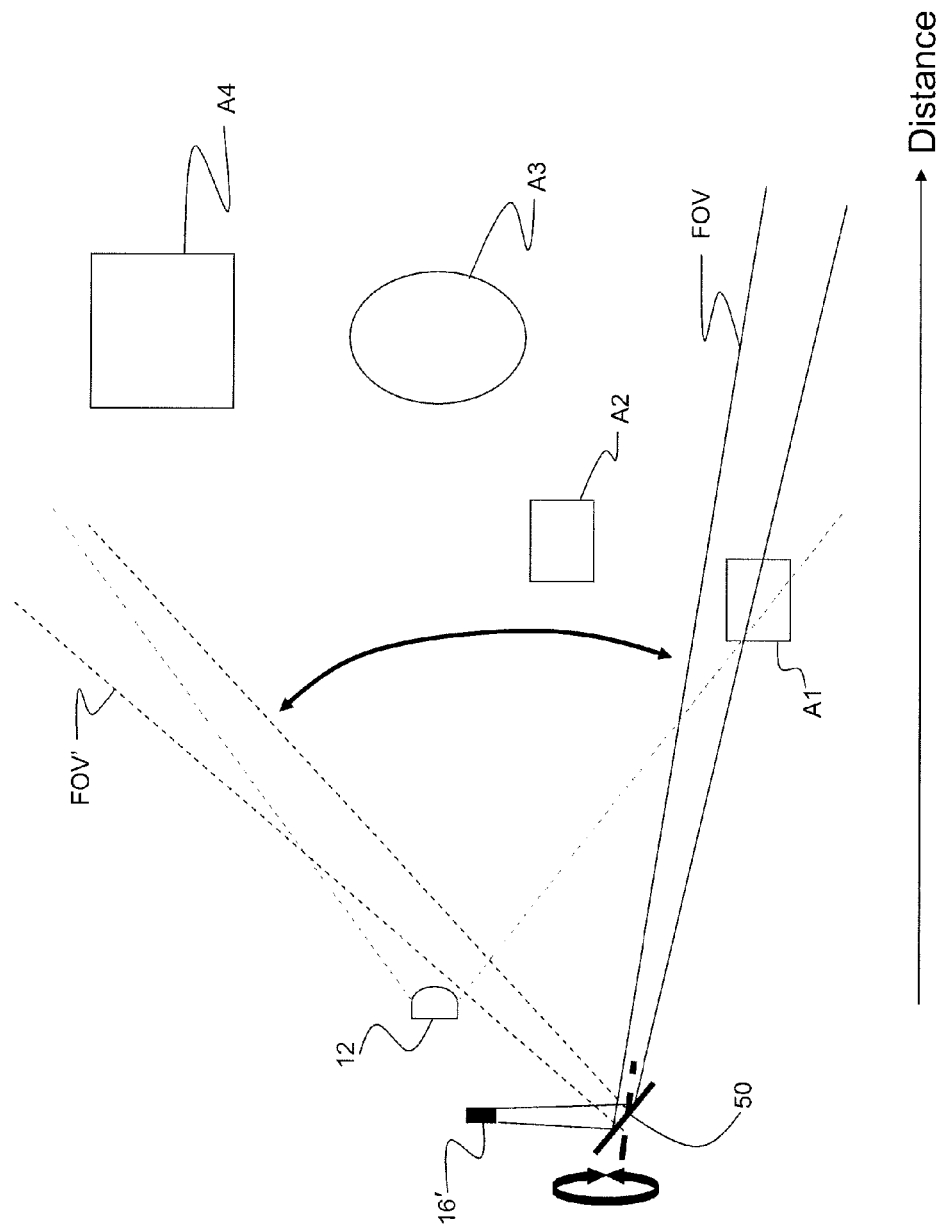
FIG. 6 is a schematic view of an alternative sensor configuration for the object-detecting lighting system of FIG. 1, with a scanning mechanism.

Another alternative embodiment of the sensor configuration is depicted in FIG. 6. In this case, the light source 12 illuminates the same scene enclosing objects A1 through A4, but only one discrete detector 16' having a narrow field of view FOV is used in combination with a scanning mechanism 50. The scanning mechanism 50 changes the portion of the illuminated volume being probed by the detector, in essence changing the field of view FOV to FOV'. Again, detector 16' might be any of a photodiode, an APD, a PMT or equivalent thereof. This configuration minimizes the number of components but requires sequential probing of the illuminated volume and the use of a mobile part in the scanning mechanism 50. Moreover, a motion of the scanning mechanism 50 must be actuated by the data/signal processor 18 as the orientation of the scanning mechanism 50 will have an effect on the calculation of the position of the object.

Figure 7:
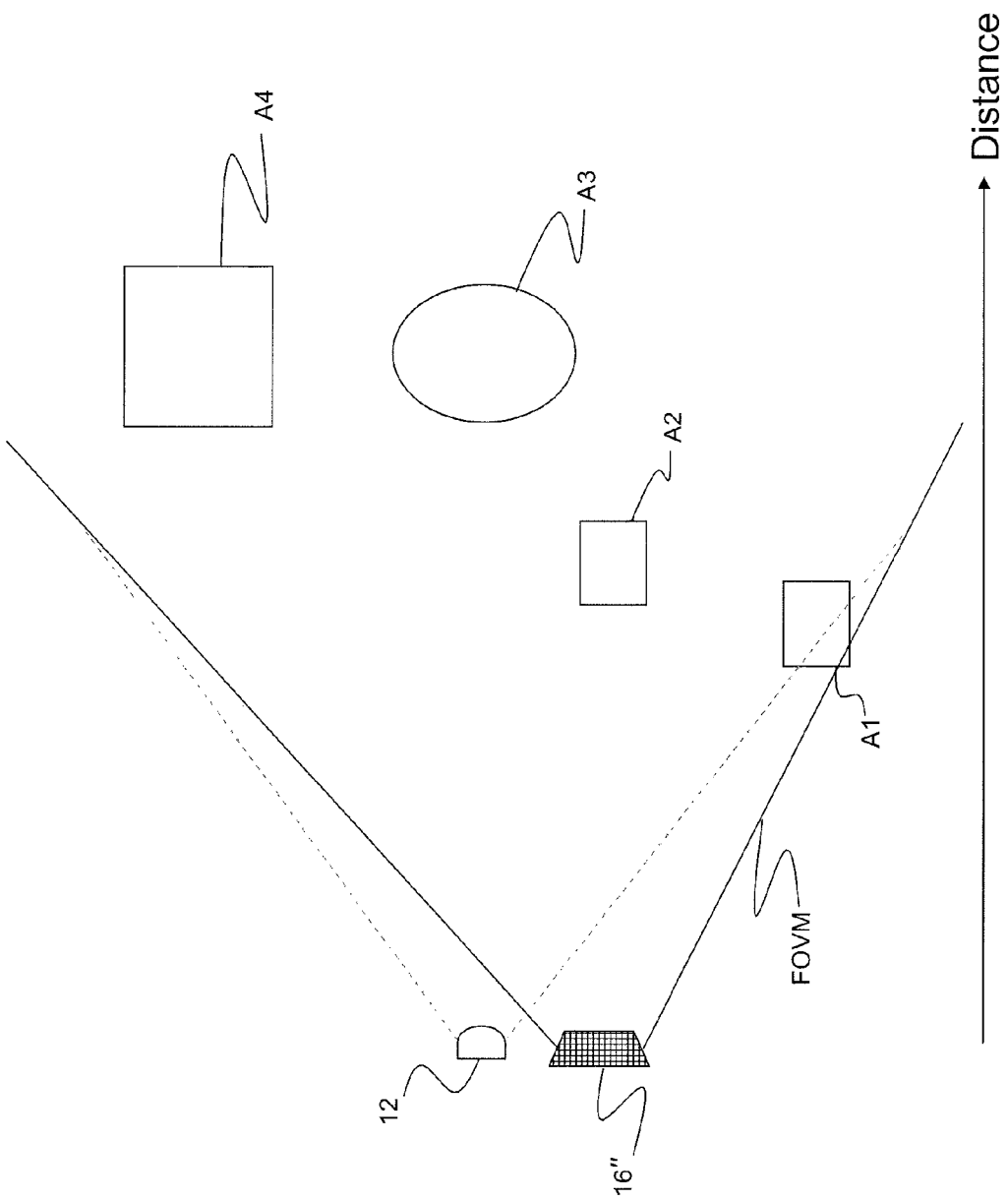
FIG. 7 is a schematic view of an alternative sensor configuration for the object-detecting lighting system of FIG. 1, using a detector array.

In another alternative embodiment of the sensor configuration illustrated by FIG. 7, the light source 12 and illuminated scene are similar to that of FIG. 6 (objects A1 through A4), but a detection array 16" is used with a large field of view FOVM encompassing the whole illuminated scene. Each pixel of the array 16' acts as a discrete detector with a very narrow field of view and probes a specific portion of the illuminated scene, as determined by any secondary optics in front of the array. The array 16" is any linear or 2D type array, such as APD or photodiode arrays, CCD and CMOS sensors.

Figure 8:
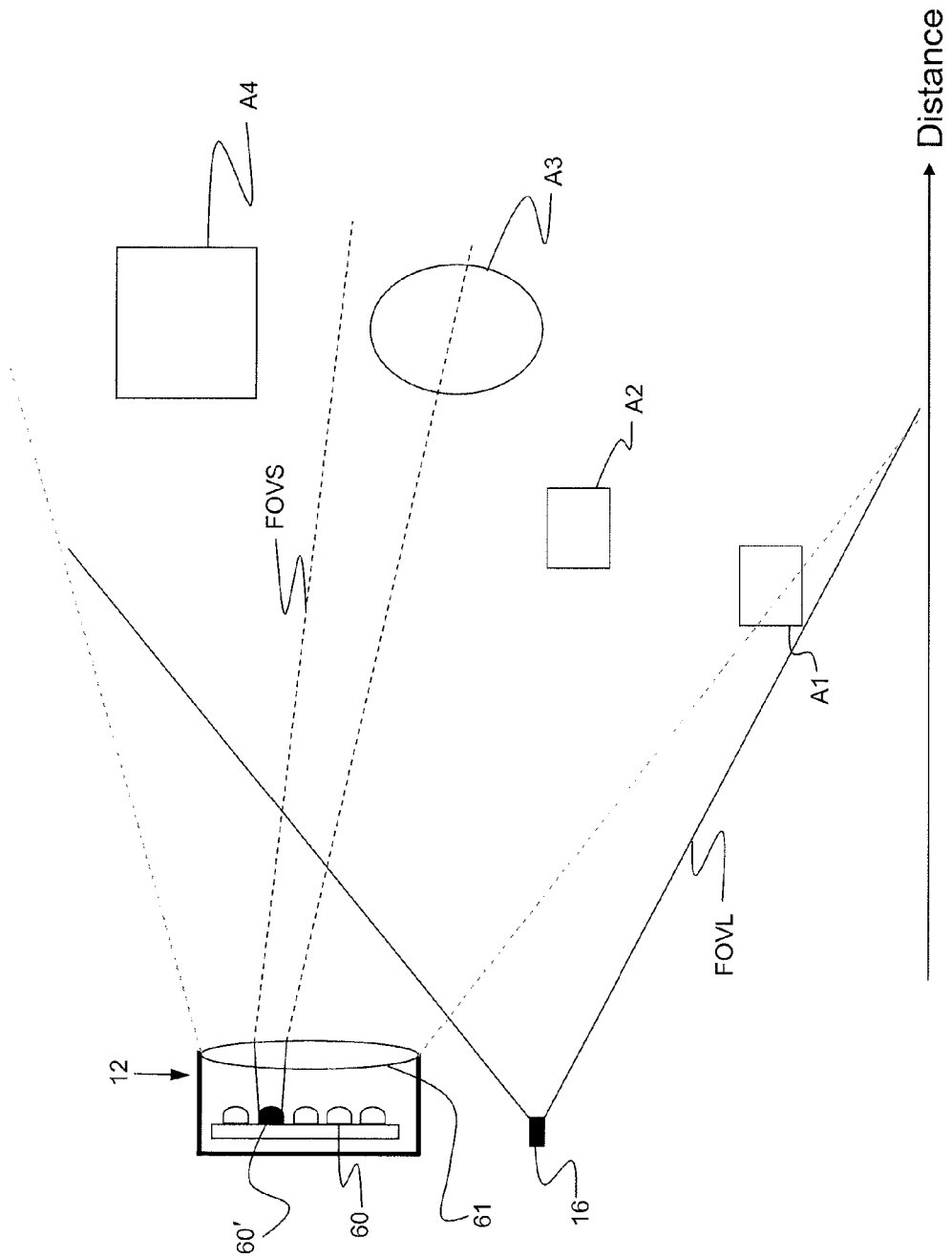
FIG. 8 is a schematic view of an alternative sensor configuration for the object-detecting lighting system of FIG. 1, using a light source array.

Another alternative embodiment presented in FIG. 8 transfers to the source side the need to select a field of view of detection from within the field of view of illumination. In this embodiment, the light source 12 is composed of multiple individual lighting elements 60 (e.g. LEDs or small clusters of LEDs) that are driven together by the illumination drive signal (without modulation), providing constant illumination of the scene.

Using a sequencing component within the source controller 14, each lighting element 60 can be switched in turn from the illumination signal only to the modulated signal (or a combination of both illumination and modulation drive signals) required by the predetermined driving mode for a specific duration in a cycle. The modulated light element, illustrated by 60', illuminates only a portion of the scene with a narrow field of view FOVS, as determined by the appropriately designed secondary optics 61, while the other elements 60 are fed the illumination drive signal only, illuminating the rest of the scene without modulation. The secondary optics 61 may take various forms (e.g., bulk, fiber) in accordance with the application.

After the specified duration, another element 60 is switched to modulated mode and the initial element 60' falls back to the illumination drive signal only. This operation is repeated according to programming of the data/signal processor 18, which controls drive sequencing (as shown in FIG. 1). In essence, the modulated or pulsed light emission is being scanned in discrete steps in the illuminated spatial volume.

In such a configuration, a discrete detector 16 with a large field of view FOVL encompassing the entire illuminated scene will be sensitive only to objects within FOVS (for example, Object A3 in FIG. 8). Again, the discrete detector 16 may be any of a photodiode, an APD, a PMT or equivalent thereof. This configuration is well adapted to applications where the light source 12 is or can be a group of lighting elements and simplifies the detection stage design, at the price of possible lower brightness of the modulated or pulsed source, more sophisticated design of the secondary source optics and sequential probing of the spatial volume of interest.

Use in the Automotive Industry

Solutions are sought in the fields of the automotive industry and urban power management efficiency, and the lighting system 10 is particularly well suited for such applications. For example, the automotive industry is looking for automated means to detect and measure the distance to cars and pedestrians around automobiles in order to automatically control the speed and brakes of the vehicles in collision avoidance systems and for adaptive cruise controls. These collisions are responsible for multiple deaths and injuries every year.

The automotive industry is moving toward new technologies (e.g., collision avoidance systems, pedestrian safety systems, blind spot detection, occupant position detectors, etc) in order to decrease the number of fatalities related to collisions. One way of performing this is to automatically detect obstacles along and beside the road with the lighting system 10 and to make the car or the driver react accordingly.

For example, it is contemplated to link cruise control systems (and other safety systems) as the external system B associated with the lighting system 10. Such adaptive cruise control can be used to allow a car to automatically adapt its speed to a preceding car.

LIDAR systems have been described in the prior art as being used in cars. In such applications, a laser is generally required for sufficient suppression of background sunlight or other cars' headlights. Furthermore, in order to cover a large field of view allowing the driving lane and also the lanes on each side to be seen, the laser has to scan all around the car, or many lasers have to be used making this an expensive and complicated lighting device.

On the other hand, the lighting system 10 may use the headlights or signal lights based on LEDs (or other similar solid-state lighting devices) already present in cars as light source 12, whereby a large field of view would be covered without moving mechanical parts. The LEDs of the headlights can be modulated or pulsed in order to get the capability to discriminate more easily against the background lights. As the background lights of other vehicles could be equipped with the lighting system 10 as well, the modulation frequencies used could then be swept (or shifted in time such as in optical-frequency-domain reflectometry) in order to allow discrimination of a large amount of cars lighting devices without possible interference. Alternatively, the method of signature modulation described above for FIG. 2 could also be used.

Furthermore, the amplitude modulation or pulses can be used through known phase shift or time of flight measurements to get the distance between the car and other cars or objects (such as pedestrians) in the field of illumination of the headlights. This, coupled with adaptive cruise control, can be used to control the car's speed or brakes to avoid possible collisions at a lower cost and possibly with better efficiency and larger diffusion in all car market categories from low- to high-budget cars. In fact, all the already installed lighting systems around and in the car (such as brake, turn lights, or car ceiling lights) could be used in a similar manner to collect information on the presence and distance (up to 5 to 10 m) of objects or individuals, by designing/retrofitting them into the lighting system 10, provided the light source 12 is suitable. The visibility in bad weather could also be estimated through light-diffusion measurements on snow, fog, dust or rain.

Police or governmental vehicles could even be equipped with more capable detection systems to detect cars with bad gas emissions causing pollution problems. Other applications considered include parking assistance, blind-spot detector.

Use in Infrastructures

Energy consumption is an increasing concern because of the rising costs of energy. Efficient street lighting power consumption, and thus energy budgets of cities, will benefit from LEDs when they reach this application. Controlling the light level is readily achieved with LEDs compared to current sodium luminaires which have a restrike time in the order of minutes. Thus, with LEDs it becomes feasible to control streetlight level when no civilians are circulating under these lights, and this also allows energy savings.

Current street-lighting systems do not allow the adjustment of light level on demand which would readily be performed using the lighting system 10. Such adjustment capability would allow a decrease in their energy consumption. For example, sodium lights can hardly be adjusted in intensity. Usually, no detection systems are present, or they are based on movement detection sensors, which are usually based on infrared detectors that can hardly detect moving people or vehicles at hot ambient temperatures or people covered in winter clothes in cold weather.

Furthermore, such detectors work better at short range and with a limited field of view and, since many streetlights are placed on long posts, they would suffer many calibration problems for that application. Even if streetlights were to show characteristics allowing them to be adjusted in intensity on demand, this would probably be one reason why such detectors would not be placed on streetlights. An adapted detector would need to cover a large field of view, not being sensitive only to heat difference, but being sensitive enough inside the field of view to detect as well pedestrians than trucks. Finally, it would also need to be technologically available and integrated at low costs.

Traffic lights are another lighting application that is currently using LEDs as a light source. In this case, the increased irradiance, lifetime, switching time and efficiency are beneficial to the application. In this latter case, an improvement would be to add the features of the lighting system 10 to these lights by esigning/retrofitting the lights with the various components of the lighting system 10, rather than to use inductive or capacitive sensors placed at high cost into the ground under the road pavement.

In the case of prior art traffic lights with detection capabilities, sensors are placed under the pavement. Then, when a vehicle arrives at road crossings, it is detected (by electrical induction or capacitive sensing) and the traffic lights are activated with predetermined timing settings. However, to place these sensors under the pavement requires costly excavation work to be performed for each road crossing.

With such sensors, the detection occurs only at the level of the sensors, so the speed and the number of cars cannot readily be estimated. The features of the lighting system 10 would allow further intelligence to be implemented into the traffic light systems, and thus more possibility of lowering the risk of car accidents.

Using an optical detector to detect cars beneath or beside the lights, as proposed by the lighting system 10, would allow cheaper detection, since the pavement would not need to be removed to put the detector into place. Maintenance and repairs would also be less costly. Furthermore, using multiple detectors having different fields of view would allow detection of many vehicles at the same time and/or their speed, making it a useful tool for traffic measurement and control.

The speed of the vehicles could also be measured with the modulation phase shift measurement (or time of flight of pulsed light) technique described previously. Here again, the visibility changes in different weather conditions could also be measured. In fact, the signaling yellow lights seen along roads in the vicinity of rivers to signal poor visibility conditions caused by fog could be used as visible-light sources that would allow such visibility to be measured with proper detection. The lighting system 10 could be used to detect an encoded light source placed on emergency vehicles (that could be the vehicle emergency lights themselves if based on LEDs) having a specific modulation scheme allowing to send a signal to the traffic lights to make them turn green in their favor. The optical detector 16 of the lighting system 10 can be used to detect an encoded incoming light signal from external (or other) light sources such as a remote control that would allow communication in order to control, calibrate or configure the lighting unit for the current location and usage requirements.

The measurement of vehicle speed is also possible either by distance measurement or by measurement of their time of passage at different points along the street lane beneath the LED street-lighting devices. This makes possible gathering of information that would not otherwise be possible, without installing special devices or sensors.

It is even possible to envision the possibility of implementing spectroscopic detection at two (or more) different wavelengths of gas emission from vehicles or other sources in the vicinity of the streetlights (for homeland security issues). The different wavelengths would then allow detection (with two detectors detecting different wavelengths) of a difference in signals from either different absorption or diffusion levels from gases. Here again, the visibility changes in different weather conditions could also be measured.

For luminaires or streetlights based on LEDs, the same type of possibility could be implemented, through the use of already installed lighting, allowing the detection of the presence of individuals or vehicles beneath the lights in order to control the light level accordingly. When no circulation is detected, the light level can be lowered to decrease the energy required.

In fact, streetlights and traffic lights equipped with the detection capabilities provided by the lighting system 10 could be the base of a network allowing to manage traffic and vehicle circulation inside cities and emergency situations having impacts on traffic. This could be made possible by putting their data/signal processing units 18 in communication with a central external traffic managing system (i.e., external system B) through RF links or through power lines.

Use in Building Applications

In the case of lights used inside and outside houses and offices, two things need to be considered. The possibility of adjusting their intensity would allow better energy usage, while detection capabilities would allow adjustment of light intensity related to room usage and surveillance sensing for security systems. Current lighting systems used in and outside homes do not provide automatic adjustment of light level, or, if they do, they usually use IR movement detectors that are integrated apart from the light enclosure itself, or they are not based on the detection of the actual lighting itself. This results in higher production and installation costs.

In interior applications, the detection can include the presence and activity of individuals to control the light level accordingly or for surveillance to replace current movement detectors (e.g., in publicity, to flash an advertisement upon detection of the presence of a person), the detection of smog, the detection of hazardous gases.

Since the LED lightings can easily be modulated, in case of emergency situations, they can be made to blink so that people are more easily aware. The blinking sequence of different LED lightings located along an exit path can even be made to indicate the direction of the emergency exits.

In fact, the lighting units of a building can be made intelligent if they can communicate with each other through a local network. The network could be based on wireless communication links, on the light generated by one unit if it can reach other units, or on actual power lines. The communication between the lighting modules would allow them to be lit in a sequence along a path for people walking, for example, in a corridor. The communication capabilities can also be extended to the external system B being centralized in a house to record regular human activities and to adjust house heating, security level and comfort to these activities. Such information could also be used by centralized security system to check for possible emergency situations, such as people being inactive for more than 12 hours in a room.

There are numerous other applications for the lighting system 10. This includes interior and exterior lighting used in homes, farms, industrial buildings, commercial buildings, stadiums, etc.

The invention claimed is:

1. A method for detecting an object using visible light, comprising:
    providing a visible-light source emitting visible light having a first function of being visible to a person in an illumination mode;
    driving the visible-light source into emitting visible light in a predetermined mode in which light has a signal form comprising mode data, with visible light in the illumination mode and the predetermined mode being visually similar to an unaided human eye whereby the light source maintains said first function while being driven;
    receiving a reflection/backscatter of the emitted visible light on an object to detect the signal form; and
    calculating at least a distance between the object and the visible-light source based on the mode data of the reflection/backscatter received and of the predetermined mode.

2. The method according to claim 1, wherein the first function is at least one of illuminating an environment of the visible-light source and emitting a signal to a person in the environment.

3. The method according to claim 1, wherein the step of connecting comprises retrofitting a source controller to an existing visible-light source.

4. The method according to claim 1, wherein the step of driving the visible-light source in the predetermined mode comprises at least one of pulsating and modulating the visible light.

5. The method according to claim 1, wherein the step of receiving the reflection/backscatter comprises filtering out given light wavelengths to obtain predetermined wavelengths so as to filter out unwanted wavelengths.

6. The method according to claim 1, wherein the step of calculating a distance of the object is performed by measuring a time delay between emitting the visible light and receiving the reflection/backscatter from the object.

7. The method according to claim 1, further comprising a step of triggering an action as a function of the position of the object.

8. The method according to claim 1, wherein calculating at least a distance of the object comprises calculating a spatial position of the object in an environment illuminated by the visible-light source as a function of the reflection/backscatter received and of the predetermined mode.

9. An object-detecting lighting system comprising:
    a light source emitting visible light and having a first function of emitting visible light in an illumination mode for at least one of illuminating an environment and emitting a signal to a person in the environment;
    a source controller for driving the light source into emitting the visible light in a predetermined mode in which light has a signal form comprising mode data, with visible light in the illumination mode and the predetermined mode being visually similar to an unaided human eye whereby the light source maintains said first function while being driven;
    an optical detector positioned with respect to the light source and adapted to detect the signal form of the visible light as reflected/backscattered by an object; and
    a data/signal processor for receiving detection data from the optical detector, the data/signal processor producing a data output associated to the object as a function of the predetermined mode and the detected mode data from the light reflected/backscattered.

10. The object-detecting lighting system according to claim 9, wherein the optical detector involves a plurality of sub-detectors each detecting a narrow range, with each sub-detector combining to cover a wide range of emitted light of the light source.

11. The object-detecting lighting system according to claim 9, further comprising a scanning mechanism in association with the optical detector so as to cause a scanning motion of a field of view of the optical detector within a range of illumination of emitted light of the light source.

12. The object-detecting lighting system according to claim 9, wherein the optical detector has an array of sub-detectors.

13. The object-detecting lighting system according to claim 9, wherein the source controller has a pulse/modulation driver to drive the light source into emitting visible-light in the predetermined mode, and an illumination driver to drive the light source into emitting visible-light of suitable intensity to illuminate an environment.

14. The object-detecting lighting system according to claim 13, wherein the light source has a plurality of lights, with at least one of the lights of the light source being driven by the illumination driver to illuminate the environment, while at least another one of the lights of the light source is driven by the pulse/modulation driver to emit the visible light in the predetermined mode.

15. The object-detecting lighting system according to claim 9, wherein the optical detector has a filtering device to filter out given light wavelengths of the reflected/backscattered visible light so as to filter out unwanted wavelengths.

* * * * *